(12) United States Patent
Deosaran et al.

(10) Patent No.: US 7,558,945 B2
(45) Date of Patent: *Jul. 7, 2009

(54) SYSTEM AND METHOD FOR REGISTER RENAMING

(75) Inventors: Trevor A. Deosaran, Sunnyvale, CA (US); Sanjiv Garg, Fremont, CA (US); Kevin R. Iadonato, San Jose, CA (US)

(73) Assignee: Seiko Epson Corporation (JP)

( * ) Notice: Subject to any disclaimer, the term of this patent is extended or adjusted under 35 U.S.C. 154(b) by 8 days.

This patent is subject to a terminal disclaimer.

(21) Appl. No.: 11/235,090

(22) Filed: Sep. 27, 2005

(65) Prior Publication Data

US 2006/0020773 A1 Jan. 26, 2006

Related U.S. Application Data

(63) Continuation of application No. 10/222,935, filed on Aug. 19, 2002, now Pat. No. 6,970,995, which is a continuation of application No. 10/083,143, filed on Feb. 27, 2002, now Pat. No. 6,922,772, which is a continuation of application No. 09/826,211, filed on Apr. 5, 2001, now Pat. No. 6,408,375, which is a continuation of application No. 09/399,000, filed on Sep. 17, 1999, now Pat. No. 6,272,617, which is a continuation of application No. 09/063,059, filed on Apr. 21, 1998, now Pat. No. 6,138,231, which is a continuation of application No. 08/698,211, filed on Aug. 15, 1996, now Pat. No. 5,809,276, which is a continuation of application No. 08/478,531, filed on Jun. 7, 1995, now Pat. No. 5,590,295, which is a continuation of application No. 07/997,948, filed on Dec. 31, 1992, now abandoned.

(51) Int. Cl.
*G06F 9/38* (2006.01)

(52) U.S. Cl. .................................................... 712/217

(58) Field of Classification Search ................... 712/217
See application file for complete search history.

(56) References Cited

U.S. PATENT DOCUMENTS 3,346,851 A 10/1967 Thorn et al.

(Continued)

FOREIGN PATENT DOCUMENTS

EP 0 170 284 2/1986

(Continued)

OTHER PUBLICATIONS

Acosta, R. D. et al., "An Instruction Issuing Approach to Enhancing Performance in Multiple Functional Unit Processors," *IEEE Transactions On Computers*, IEEE, vol. C-35, No. 9, pp. 815-828 (Sep. 1986).

(Continued)

*Primary Examiner*—William M Treat
(74) *Attorney, Agent, or Firm*—Sterne, Kessler, Goldstein & Fox P.L.L.C.

(57) ABSTRACT

A system and method for performing register renaming of source registers in a processor having a variable advance instruction window for storing a group of instructions to be executed by the processor, wherein a new instruction is added to the variable advance instruction window when a location becomes available. A tag is assigned to each instruction in the variable advance instruction window. The tag of each instruction to leave the window is assigned to the next new instruction to be added to it. The results of instructions executed by the processor are stored in a temp buffer according to their corresponding tags to avoid output and anti-dependencies. The temp buffer therefore permits the processor to execute instructions out of order and in parallel. Data dependency checks for input dependencies are performed only for each new instruction added to the variable advance instruction window and register renaming is performed to avoid input dependencies.

24 Claims, 8 Drawing Sheets

U.S. PATENT DOCUMENTS

| | | |
|---|---|---|
| 3,718,912 A | 2/1973 | Hasbrouck et al. |
| 3,771,138 A | 11/1973 | Celtruda et al. |
| 3,789,365 A | 1/1974 | Jen et al. |
| 3,913,074 A | 10/1975 | Homberg et al. |
| 4,034,349 A | 7/1977 | Monaco et al. |
| 4,128,880 A | 12/1978 | Cray, Jr. |
| 4,200,927 A | 4/1980 | Hughes et al. |
| 4,212,076 A | 7/1980 | Conners |
| 4,228,495 A | 10/1980 | Bernhard et al. |
| 4,296,470 A | 10/1981 | Fairchild et al. |
| 4,315,308 A | 2/1982 | Jackson |
| 4,315,314 A | 2/1982 | Russo |
| 4,410,939 A | 10/1983 | Kawakami |
| 4,434,461 A | 2/1984 | Puhl |
| 4,459,657 A | 7/1984 | Murao |
| 4,476,525 A | 10/1984 | Ishii |
| 4,482,950 A | 11/1984 | Dshkhunian et al. |
| 4,498,134 A | 2/1985 | Hansen et al. |
| 4,500,963 A | 2/1985 | Smith et al. |
| 4,532,598 A | 7/1985 | Shibayama et al. |
| 4,561,051 A | 12/1985 | Rodman |
| 4,574,349 A | 3/1986 | Rechtschaffen |
| 4,594,655 A | 6/1986 | Hao et al. |
| 4,597,054 A | 6/1986 | Lockwood et al. |
| 4,613,941 A | 9/1986 | Smith et al. |
| 4,626,989 A | 12/1986 | Torii |
| 4,644,466 A | 2/1987 | Saito |
| 4,648,045 A | 3/1987 | Demetrescu |
| 4,675,806 A | 6/1987 | Uchida |
| 4,714,994 A | 12/1987 | Oklobdzija et al. |
| 4,719,569 A | 1/1988 | Ludemann et al. |
| 4,722,049 A | 1/1988 | Lahti |
| 4,752,873 A | 6/1988 | Shonai et al. |
| 4,758,948 A | 7/1988 | May et al. |
| 4,766,566 A | 8/1988 | Chuang |
| 4,775,927 A | 10/1988 | Hester et al. |
| 4,791,607 A | 12/1988 | Igarashi et al. |
| 4,807,115 A | 2/1989 | Torng |
| 4,811,208 A | 3/1989 | Myers et al. |
| 4,814,978 A | 3/1989 | Dennis |
| 4,823,201 A | 4/1989 | Simon et al. |
| 4,829,467 A | 5/1989 | Ogata |
| 4,833,599 A | 5/1989 | Colwell et al. |
| 4,841,453 A | 6/1989 | Finlay et al. |
| 4,858,105 A | 8/1989 | Kuriyama et al. |
| 4,858,116 A | 8/1989 | Gillett, Jr. et al. |
| 4,881,167 A | 11/1989 | Sasaki et al. |
| 4,897,810 A | 1/1990 | Nix |
| 4,901,228 A | 2/1990 | Kodama |
| 4,901,233 A | 2/1990 | Liptay |
| 4,903,196 A | 2/1990 | Pomerene et al. |
| 4,916,604 A | 4/1990 | Yamamoto et al. |
| 4,924,376 A | 5/1990 | Ooi |
| 4,926,323 A | 5/1990 | Baror et al. |
| 4,928,226 A | 5/1990 | Kamada et al. |
| 4,942,525 A | 7/1990 | Shintani et al. |
| 4,945,479 A | 7/1990 | Rusterholz et al. |
| 4,964,057 A | 10/1990 | Yabe |
| 4,974,154 A | 11/1990 | Matsuo |
| 4,974,155 A | 11/1990 | Dulong et al. |
| 4,980,817 A | 12/1990 | Fossum et al. |
| 4,985,825 A | 1/1991 | Webb, Jr. et al. |
| 4,991,078 A | 2/1991 | Wilhelm et al. |
| 4,991,081 A | 2/1991 | Bosshart |
| 4,992,938 A | 2/1991 | Cocke et al. |
| 5,003,462 A | 3/1991 | Blaner et al. |
| 5,032,985 A | 7/1991 | Curran |
| 5,051,925 A | 9/1991 | Kadono et al. |
| 5,067,069 A | 11/1991 | Fite et al. |
| 5,072,364 A | 12/1991 | Jardine et al. |
| 5,089,951 A | 2/1992 | Iijima |
| 5,093,783 A | 3/1992 | Kitada |
| 5,097,409 A | 3/1992 | Schwartz et al. |
| 5,101,341 A | 3/1992 | Circello et al. |
| 5,109,495 A | 4/1992 | Fite et al. |
| 5,119,485 A | 6/1992 | Ledbetter, Jr. et al. |
| 5,120,083 A | 6/1992 | Stine |
| 5,125,083 A | 6/1992 | Fite et al. |
| 5,125,092 A | 6/1992 | Prener |
| 5,127,091 A | 6/1992 | Boufarah et al. |
| 5,129,067 A | 7/1992 | Johnson |
| 5,133,074 A | 7/1992 | Chou |
| 5,133,077 A | 7/1992 | Karne et al. |
| 5,134,561 A | 7/1992 | Liptay |
| 5,136,697 A | 8/1992 | Johnson |
| 5,140,682 A | 8/1992 | Okura et al. |
| 5,142,633 A | 8/1992 | Murray et al. |
| 5,142,634 A | 8/1992 | Fite et al. |
| 5,148,533 A | 9/1992 | Joyce et al. |
| 5,148,536 A | 9/1992 | Witek et al. |
| 5,150,309 A | 9/1992 | Shaw et al. |
| 5,155,843 A | 10/1992 | Stamm et al. |
| 5,167,026 A | 11/1992 | Murray et al. |
| 5,167,035 A | 11/1992 | Mann et al. |
| 5,179,530 A | 1/1993 | Genusov et al. |
| 5,179,673 A | 1/1993 | Steely, Jr. et al. |
| 5,179,689 A | 1/1993 | Leach et al. |
| 5,185,872 A | 2/1993 | Arnold et al. |
| 5,185,878 A | 2/1993 | Baror et al. |
| 5,187,796 A | 2/1993 | Wang et al. |
| 5,193,157 A | 3/1993 | Barbour et al. |
| 5,197,132 A | 3/1993 | Steely, Jr. et al. |
| 5,197,136 A | 3/1993 | Kimura et al. |
| 5,201,056 A | 4/1993 | Daniel et al. |
| 5,214,763 A | 5/1993 | Blaner et al. |
| 5,214,786 A | 5/1993 | Watanabe et al. |
| 5,222,223 A | 6/1993 | Webb, Jr. et al. |
| 5,222,240 A | 6/1993 | Patel |
| 5,222,244 A | 6/1993 | Carbine et al. |
| 5,226,125 A | 7/1993 | Balmer et al. |
| 5,226,126 A | 7/1993 | McFarland et al. |
| 5,226,166 A | 7/1993 | Ishida et al. |
| 5,226,170 A | 7/1993 | Rubinfeld |
| 5,228,136 A | 7/1993 | Shimizu et al. |
| 5,230,068 A | 7/1993 | Van Dyke et al. |
| 5,233,694 A | 8/1993 | Hotta et al. |
| 5,237,666 A | 8/1993 | Suzuki et al. |
| 5,241,636 A | 8/1993 | Kohn |
| 5,249,286 A | 9/1993 | Alpert et al. |
| 5,251,306 A | 10/1993 | Tran |
| 5,255,384 A | 10/1993 | Sachs et al. |
| 5,261,057 A | 11/1993 | Coyle et al. |
| 5,261,071 A | 11/1993 | Lyon |
| 5,276,899 A | 1/1994 | Neches |
| 5,278,963 A | 1/1994 | Hattersley et al. |
| H1291 H | 2/1994 | Hinton et al. |
| 5,283,903 A | 2/1994 | Uehara |
| 5,285,527 A | 2/1994 | Crick et al. |
| 5,287,465 A | 2/1994 | Kurosawa et al. |
| 5,287,467 A | 2/1994 | Blaner et al. |
| 5,291,615 A | 3/1994 | Okamoto |
| 5,293,500 A | 3/1994 | Ishida et al. |
| 5,301,278 A | 4/1994 | Bowater et al. |
| 5,303,362 A | 4/1994 | Butts, Jr. et al. |
| 5,303,382 A | 4/1994 | Buch et al. |
| 5,317,720 A | 5/1994 | Stamm et al. |
| 5,345,569 A | 9/1994 | Tran |
| 5,355,457 A | 10/1994 | Shebanow et al. |
| 5,355,460 A | 10/1994 | Eickemeyer et al. |
| 5,367,660 A | 11/1994 | Gat et al. |
| 5,371,684 A | 12/1994 | Iadonato et al. |
| 5,377,339 A | 12/1994 | Saito et al. |
| 5,388,215 A | 2/1995 | Baker et al. |
| 5,390,355 A | 2/1995 | Horst |

| | | | | | |
|---|---|---|---|---|---|
| 5,394,351 A | 2/1995 | Widigen et al. | 5,689,720 A | 11/1997 | Nguyen et al. |
| 5,394,515 A | 2/1995 | Lentz et al. | 5,708,841 A | 1/1998 | Popescu et al. |
| 5,394,529 A | 2/1995 | Brown, III et al. | 5,734,584 A | 3/1998 | Iadonato et al. |
| 5,398,330 A | 3/1995 | Johnson | 5,737,624 A | 4/1998 | Garg et al. |
| 5,404,470 A | 4/1995 | Miyake | 5,745,375 A | 4/1998 | Reinhardt et al. |
| 5,404,472 A | 4/1995 | Kurosawa et al. | 5,754,800 A | 5/1998 | Lentz et al. |
| 5,430,884 A | 7/1995 | Beard et al. | 5,768,575 A | 6/1998 | McFarland et al. |
| 5,430,888 A | 7/1995 | Witek et al. | 5,778,210 A | 7/1998 | Henstrom et al. |
| 5,436,869 A | 7/1995 | Yoshida | 5,797,025 A | 8/1998 | Popescu et al. |
| 5,440,752 A | 8/1995 | Lentz et al. | 5,802,605 A | 9/1998 | Alpert et al. |
| 5,442,757 A | 8/1995 | McFarland et al. | 5,809,276 A * | 9/1998 | Deosaran et al. ............ 712/217 |
| 5,446,912 A | 8/1995 | Colwell et al. | 5,819,101 A | 10/1998 | Peleg et al. |
| 5,448,705 A | 9/1995 | Nguyen et al. | 5,826,055 A | 10/1998 | Wang et al. |
| 5,452,426 A | 9/1995 | Papworth et al. | 5,831,871 A | 11/1998 | Iadonato et al. |
| 5,461,715 A | 10/1995 | Matsuo et al. | 5,832,205 A | 11/1998 | Kelly et al. |
| 5,471,592 A | 11/1995 | Gove et al. | 5,832,292 A | 11/1998 | Nguyen et al. |
| 5,473,764 A | 12/1995 | Chi | 5,832,293 A | 11/1998 | Popescu et al. |
| 5,481,685 A | 1/1996 | Nguyen et al. | 5,838,986 A | 11/1998 | Garg et al. |
| 5,481,734 A | 1/1996 | Yoshida | 5,881,275 A | 3/1999 | Peleg et al. |
| 5,487,156 A | 1/1996 | Popescu et al. | 5,892,963 A | 4/1999 | Iadonato et al. |
| 5,488,729 A | 1/1996 | Vegesna et al. | 5,896,542 A | 4/1999 | Iadonato et al. |
| 5,490,280 A | 2/1996 | Gupta et al. | 5,941,979 A | 8/1999 | Lentz et al. |
| 5,493,687 A | 2/1996 | Garg et al. | 5,961,629 A | 10/1999 | Nguyen et al. |
| 5,497,499 A | 3/1996 | Garg et al. | 5,974,526 A | 10/1999 | Garg et al. |
| 5,524,225 A | 6/1996 | Kranich | 6,038,653 A | 3/2000 | Nguyen et al. |
| 5,539,911 A | 7/1996 | Nguyen et al. | 6,038,654 A | 3/2000 | Nguyen et al. |
| 5,559,951 A | 9/1996 | Lentz et al. | 6,044,449 A | 3/2000 | Garg et al. |
| 5,560,032 A | 9/1996 | Nguyen et al. | 6,047,348 A | 4/2000 | Lentz et al. |
| 5,560,035 A | 9/1996 | Garg et al. | 6,083,274 A | 7/2000 | Iadonato et al. |
| 5,561,775 A | 10/1996 | Kurosawa et al. | 6,092,176 A | 7/2000 | Iadonato et al. |
| 5,561,776 A | 10/1996 | Popescu et al. | 6,092,181 A | 7/2000 | Nguyen et al. |
| 5,564,056 A | 10/1996 | Fetterman et al. | 6,101,594 A | 8/2000 | Nguyen et al. |
| 5,564,117 A | 10/1996 | Lentz et al. | 6,128,723 A | 10/2000 | Nguyen et al. |
| 5,566,385 A | 10/1996 | Iadonato et al. | 6,131,157 A | 10/2000 | Wang et al. |
| 5,568,624 A | 10/1996 | Sites et al. | 6,138,231 A * | 10/2000 | Deosaran et al. ............ 712/216 |
| 5,574,927 A | 11/1996 | Scantlin | 6,219,763 B1 | 4/2001 | Lentz et al. |
| 5,574,935 A | 11/1996 | Vidwans et al. | 6,249,856 B1 | 6/2001 | Garg et al. |
| 5,574,941 A | 11/1996 | Horst | 6,256,720 B1 | 7/2001 | Nguyen et al. |
| 5,577,200 A | 11/1996 | Abramson et al. | 6,272,579 B1 | 8/2001 | Lentz et al. |
| 5,577,217 A | 11/1996 | Hoyt et al. | 6,272,617 B1 * | 8/2001 | Deosaran et al. ............... 712/23 |
| 5,584,001 A | 12/1996 | Hoyt et al. | 6,272,619 B1 | 8/2001 | Nguyen et al. |
| 5,586,278 A | 12/1996 | Papworth et al. | 6,282,630 B1 | 8/2001 | Nguyen et al. |
| 5,590,295 A * | 12/1996 | Deosaran et al. ............ 712/217 | 6,289,433 B1 | 9/2001 | Garg et al. |
| 5,592,636 A | 1/1997 | Popescu et al. | 6,360,309 B1 | 3/2002 | Iadonato et al. |
| 5,604,865 A | 2/1997 | Lentz et al. | 6,385,634 B1 | 5/2002 | Peleg et al. |
| 5,604,877 A | 2/1997 | Hoyt et al. | 6,401,232 B1 | 6/2002 | Iadonato et al. |
| 5,604,912 A | 2/1997 | Iadonato et al. | 6,408,375 B2 * | 6/2002 | Deosaran et al. ............... 712/23 |
| 5,606,676 A | 2/1997 | Grochowski et al. | 6,412,064 B1 | 6/2002 | Wang et al. |
| 5,608,885 A | 3/1997 | Gupta et al. | 6,418,529 B1 | 7/2002 | Roussel |
| 5,613,132 A | 3/1997 | Clift et al. | 6,611,908 B2 | 8/2003 | Lentz et al. |
| 5,615,126 A | 3/1997 | Deeley et al. | 6,647,485 B2 | 11/2003 | Nguyen et al. |
| 5,615,385 A | 3/1997 | Fetterman et al. | 6,735,685 B1 | 5/2004 | Senter et al. |
| 5,617,554 A | 4/1997 | Alpert et al. | 6,757,808 B2 | 6/2004 | Iadonato et al. |
| 5,619,664 A | 4/1997 | Glew | 6,775,761 B2 | 8/2004 | Wang et al. |
| 5,619,668 A | 4/1997 | Zaidi | 6,782,521 B2 | 8/2004 | Iadonato et al. |
| 5,623,628 A | 4/1997 | Brayton et al. | 6,915,412 B2 | 7/2005 | Nguyen et al. |
| 5,625,788 A | 4/1997 | Boggs et al. | 6,920,548 B2 | 7/2005 | Wang et al. |
| 5,625,837 A | 4/1997 | Popescu et al. | 6,922,772 B2 * | 7/2005 | Deosaran et al. ............ 712/217 |
| 5,627,983 A | 5/1997 | Popescu et al. | 6,934,829 B2 | 8/2005 | Nguyen et al. |
| 5,627,984 A | 5/1997 | Gupta et al. | 6,941,447 B2 | 9/2005 | Nguyen et al. |
| 5,627,985 A | 5/1997 | Fetterman et al. | 6,948,052 B2 | 9/2005 | Nguyen et al. |
| 5,628,021 A | 5/1997 | Iadonato et al. | 6,954,844 B2 | 10/2005 | Lentz et al. |
| 5,630,075 A | 5/1997 | Joshi et al. | 6,959,375 B2 | 10/2005 | Nguyen et al. |
| 5,630,083 A | 5/1997 | Carbine et al. | 6,970,995 B2 * | 11/2005 | Deosaran et al. ............ 712/217 |
| 5,630,149 A | 5/1997 | Bluhm | 6,986,024 B2 | 1/2006 | Nguyen et al. |
| 5,630,157 A * | 5/1997 | Dwyer, III .................... 712/23 | 7,028,161 B2 | 4/2006 | Nguyen et al. |
| 5,640,588 A | 6/1997 | Vegesna et al. | 7,043,624 B2 | 5/2006 | Iadonato et al. |
| 5,651,125 A | 7/1997 | Witt et al. | 7,051,187 B2 | 5/2006 | Garg et al. |
| 5,655,098 A | 8/1997 | Witt et al. | 7,162,610 B2 | 1/2007 | Nguyen et al. |
| 5,664,136 A | 9/1997 | Witt et al. | 7,174,525 B2 | 2/2007 | Iadonato et al. |
| 5,666,494 A | 9/1997 | Mote, Jr. | 2001/0034823 A1 | 10/2001 | Garg et al. |
| 5,682,546 A | 10/1997 | Garg et al. | 2002/0059508 A1 | 5/2002 | Lentz et al. |
| 5,689,672 A | 11/1997 | Witt et al. | 2002/0083300 A1 | 6/2002 | Deosaran et al. |

| | | | |
|---|---|---|---|
| 2002/0129324 A1 | 9/2002 | Iadonato et al. | |
| 2002/0194456 A1 | 12/2002 | Deosaran et al. | |
| 2003/0056086 A1 | 3/2003 | Nguyen et al. | |
| 2003/0056087 A1 | 3/2003 | Nguyen et al. | |
| 2003/0070060 A1 | 4/2003 | Nguyen et al. | |
| 2003/0079113 A1 | 4/2003 | Nguyen et al. | |
| 2003/0115440 A1 | 6/2003 | Garg et al. | |
| 2004/0024987 A1 | 2/2004 | Lentz et al. | |
| 2004/0054872 A1 | 3/2004 | Nguyen et al. | |
| 2004/0093482 A1 | 5/2004 | Nguyen et al. | |
| 2004/0093483 A1 | 5/2004 | Nguyen et al. | |
| 2004/0093485 A1 | 5/2004 | Nguyen et al. | |
| 2005/0228973 A1 | 10/2005 | Wang et al. | |
| 2006/0041736 A1 | 2/2006 | Garg et al. | |
| 2006/0064569 A1 | 3/2006 | Lentz et al. | |
| 2006/0123218 A1 | 6/2006 | Iadonato et al. | |
| 2006/0149925 A1 | 7/2006 | Nguyen et al. | |
| 2007/0101103 A1 | 5/2007 | Nguyen et al. | |
| 2007/0106878 A1 | 5/2007 | Nguyen et al. | |
| 2007/0106880 A1 | 5/2007 | Wang et al. | |
| 2007/0113047 A1 | 5/2007 | Garg et al. | |
| 2007/0113214 A1 | 5/2007 | Iadonato et al. | |
| 2008/0059770 A1 | 3/2008 | Garg et al. | |

FOREIGN PATENT DOCUMENTS

| | | |
|---|---|---|
| EP | 0 213 843 | 3/1987 |
| EP | 0 241 909 | 10/1987 |
| EP | 0 354 585 | 2/1990 |
| EP | 0 378 195 A2 | 7/1990 |
| EP | 0 378 195 A3 | 7/1990 |
| EP | 0 454 636 | 10/1991 |
| EP | 0 515 166 A1 | 11/1992 |
| EP | 09 533 337 A1 | 3/1993 |
| GB | 2 190 521 | 11/1987 |
| JP | 57-57345 | 4/1982 |
| JP | 60-144830 | 7/1985 |
| JP | 61-40650 | 2/1986 |
| JP | 61-107434 | 5/1986 |
| JP | 62-242243 | 10/1987 |
| JP | 63-192135 | 8/1988 |
| JP | 1-142831 | 6/1989 |
| JP | 1-199233 | 8/1989 |
| JP | 2-048732 | 2/1990 |
| JP | 2-118757 | 5/1990 |
| JP | 2-211534 | 8/1990 |
| JP | 2-224025 | 9/1990 |
| JP | 2-226342 | 9/1990 |
| JP | 3-035324 | 2/1991 |
| JP | 3-218524 | 9/1991 |
| JP | 4-054638 | 2/1992 |
| JP | 4-096132 | 3/1992 |
| JP | 4-503582 | 6/1992 |
| JP | 5-197544 | 8/1993 |
| JP | 6-019707 | 1/1994 |
| WO | WO88/09035 A2 | 11/1988 |
| WO | WO91/20331 A1 | 12/1991 |

OTHER PUBLICATIONS

Agerwala, T. and Cocke, J., "High Performance Reduced Instruction Set Processors," IBM Research Division, pp. 1-61 (Mar. 31, 1987).

Aiken, A. and Nicolau, A., "Perfect Pipelining: A New Loop Parallelization Technique," *Proceedings of the 1988 ESOP*, Springer-Verlag, pp. 221-235 (1988).

Charlesworth, A.E., "An Approach to Scientific Array Processing: The Architectural Design of the AP-120B/FPS-164 Family," *Computer*, IEEE, vol. 14, pp. 18-27 (Sep. 1981).

Colwell, R.P. et al., "A VLIW Architecture for a Trace Scheduling Compiler," *Proceedings of the 2nd International Conference on Architectural Support for Programming Languages and Operating Systems*, ACM, pp. 180-192 (Oct. 1987).

Dwyer, H, *A Multiple, Out-of-Order Instruction Issuing System for Superscalar Processors*, UMI, pp. 1-249 (Aug. 1991).

Foster, C.C. and Riseman, E.M., "Percolation of Code to Enhance Parallel Dispatching and Execution," *IEEE Transactions on Computers*, IEEE, pp. 1411-1415 (Dec. 1971).

Goodman, J.R. and Hsu, W., "Code Scheduling and Register Allocation in Large Basic Blocks," *International Conference on Supercomputing*, ACM, pp. 442-452 (1988).

Gross, T.R. and Hennessy, J.L., "Optimizing Delayed Branches," *Proceedings of the 5th Annual Workshop on Microprogramming*, IEEE, pp. 114-120 (Oct. 5-7, 1982).

Groves, R.D. and Oehler, R., "An IBM Second Generation RISC Processor Architecture," *Proceedings 1989 IEEE International Conference on Computer Design: VLSI in Computers and Processors*, IEEE, pp. 134-137 (Oct. 1989).

Horst, R.W. et al., "Multiple Instruction Issue in the NonStop Cyclone Processor," *Proceedings of the 17th Annual International Symposium on Computer Architecture*, IEEE, pp. 216-226 (1990).

Hwu, W-M. W. and Patt, Y.N., "Checkpoint Repair for High-Performance Out-of-Order Execution Machines," *IEEE Trans. On Computers*, IEEE, vol. C-36, No. 12, pp. 1496-1514 (Dec. 1987).

Hwu, W-M. W. and Chang, P.P., "Exploiting Parallel Microprocessor Microarchitectures with a Compiler Code Generator," *Proceedings of the 15th Annual Symposium on Computer Architecture*, IEEE, pp. 45-53 (Jun. 1988).

Hwu, W-M. and Patt, Y.N., "HPSm, a High Performance Restricted Data Flow Architecture Having Minimal Functionality," *Proceedings from ISCA-13*, IEEE, pp. 297-306 (Jun. 2-5, 1986).

*IBM Journal of Research and Development*, IBM, vol. 34, No. 1, pp. 1-70 (Jan. 1990).

Johnson, M. *Superscalar Microprocessor Design*, Prentice-Hall, Entire book submitted (1991).

Johnson, W. M., *Super-Scalar Processor Design*, (Dissertation), 134 pages (1989).

Jouppi, N.P. and Wall, D.W., "Available Instruction-Level Parallelism for Superscalar and Superpipelined Machines," *Proceedings of the 3rd International Conference on Architectural Support for Programming Languages and Operating Systems*, ACM, pp. 272-282 (Apr. 1989).

Jouppi, N.P., "Integration and Packaging Plateaus of Processor Performance," *International Conference of Computer Design*, IEEE, pp. 229-232 (Oct. 1989).

Jouppi, N.P., "The Nonuniform Distribution of Instruction-Level and Machine Parallelism and Its Effect on Performance," *IEEE Transactions on Computers*, IEEE, vol. 38, No. 12, pp. 1645-1658 (Dec. 1989).

Keller, R.M., "Look-Ahead Processors," *Computing Surveys*, ACM, vol. 7, No. 4, pp. 177-195 (Dec. 1975).

Lam, M.S., "Instruction Scheduling For Superscalar Architectures," *Annu. Rev. Comput. Sci.*, Annual Reviews, vol. 4, pp. 173-201 (1990).

Lightner, B.D. and Hill, G., "The Metaflow Lightning Chipset", *Compcon Spring 91*, IEEE, pp. 13-18 (Feb. 25-Mar. 1, 1991).

Murakami, K. et al., "SIMP (Single Instruction stream/Multiple instruction Pipelining): A Novel High-Speed Single-Processor Architecture," *Proc. 16th Int. Symp. on Computer Architecture*, ACM, pp. 78-85 (Jun. 1989).

Patt, Y.N. et al., "Critical Issues Regarding HPS, A High Performance Microarchitecture", *Proceedings of 18th Annual Workshop on Microprogramming*, IEEE, pp. 109-116 (Dec. 3-6, 1985).

Patt, Y.N. et al., "HPS, A New Microarchitecture: Rationale and Introduction", *The 18th Annual Workshop on Microprogramming*, Pacific Grove, CA, Dec. 3-6, 1985, IEEE Computer Society Order No. 653, pp. 103-108.

Patterson, D.A. and Hennessy, J.L., *Computer Architecture: A Quantitative Approach*, Morgan Kaufmann Publishers, pp. 257-278, 290-314 and 449 (1990).

Peleg, A. and Weiser, U., "Future Trends in Microprocessors: Out-of-Order Execution, Speculative Branching and their CISC Performance Potential", IEEE, pp. 263-266 (1991).

Pleszkun, A.R. and Sohi, G.S., "The Performance Potential of Multiple Functional Unit Processors," *Proceedings of the 15th Annual Symposium on Computer Architecture*, IEEE, pp. 37-44 (Jun. 1988).

Pleszkun, A.R. et al., "WISQ: A Restartable Architecture Using Queues," *Proceedings of the 14th International Symposium on Computer Architecture*, ACM, pp. 290-299 (Jun. 1987).

Popescu, V. et al., "The Metaflow Architecture", *IEEE Micro*, IEEE, vol. 11, No. 3, pp. 10-13 and 63-73 (Jun. 1991).

Smith, M.D. et al., "Boosting Beyond Static Scheduling in a Superscalar Processor," *International Symposium on Computer Architecture*, IEEE, pp. 344-354 (May 1990).

Smith, J.E. and Pleszkun, A.R., "Implementation of Precise Interrupts in Pipelined Processors," *Proceedings of the 12th Annual International Symposium on Computer Architecture*, IEEE, pp. 36-44 (Jun. 1985).

Smith, M.D. et al., "Limits on Multiple Instruction Issue," *Computer Architecture News*, ACM, No. 2, pp. 290-302 (Apr. 3-6, 1989).

Sohi, G.S. and Vajapeyam, G.S., "Instruction Issue Logic For High-Performance, Interruptable Pipelined Processors," *Conference Proceedings of the 14th Annual International Symposium on Computer Architecture*, pp. 27-34 (Jun. 2-5, 1987).

Thornton, J.E., *Design of a Computer: The Control Data 6600*, Control Data Corporation, pp. 58-140 (1970).

Tjaden, G.S. and Flynn, M.J., "Detection and Parallel Execution of Independent Instructions," *IEEE Trans. On Computers*, IEEE, vol. C-19, No. 10, pp. 889-895 (Oct. 1970).

Tjaden, G.S and Flynn, M.J. *Representation and Detection of Concurrency Using Ordering Matrices*, (Dissertation), UMI, pp. 1-199 (1972).

Tjaden et al., "Representation of Concurrency with Ordering Matrices," *IEEE Transactions On Computers*, IEEE, vol. C-22, No. 8, pp. 752-761 (Aug. 1973).

Tomasulo, R.M., "An Efficient Algorithm for Exploiting Multiple Arithmetic Units," *IBM Journal*, IBM, vol. 11, pp. 25-33 (Jan. 1967).

Uht, A.K., "An Efficient Hardware Algorithm to Extract Concurrency From General-Purpose Code," *Proceedings of the 19th Annual Hawaii International Conference on System Sciences*, HICSS, pp. 41-50 (1986).

Wedig, R.G., *Detection of Concurrency In Directly Executed Language Instruction Streams*, (Dissertation), UMI, pp. 1-179 (Jun. 1982).

Weiss, S. and Smith, J.E., "Instruction Issue Logic in Pipelined Supercomputers," *IEEE Trans. on Computers*, IEEE, vol. C-33, No. 11, pp. 1013-1022 (Nov. 1984).

Butler, M. and Patt, Y.,"An Improved Area-Efficient Register Alias Table for Implementing HPS," University of Michigan, Ann Arbor, Michigan, 24 pages (Jan. 23, 1990).

Butler, M. and Patt, Y., "An Investigation of the Performance of Various Dynamic Scheduling Techniques," *Proceedings from MICRO-25*, pp. 1-9 (Dec. 1-4, 1992).

Butler, M. et al., "Single Instruction Stream Parallelism Is Greater than Two," *The 18th Annual International Symposium on Computer Architecture*, ACM SIGARCH, vol. 19, No. 3, pp. 276-286 (May 1991).

Gee, J. et al., "The Implementation of Prolog via VAX 8600 Microcode," IEEE, pp. 68-74 (1986).

Hwu, W.-M. et al., "An HPS Implementation of VAX: Initial Design and Analysis," *Proceedings of the Nineteenth Annual Hawaii International Conference on System Sciences*, pp. 282-291 (1986).

Hwu, W.-M. et al., "Design Choices for the HPSm Microprocessor Chip," *Proceedings of the Twentieth Annual Hawaii International Conference on System Sciences*, pp. 330-336 (1987).

Hwu, W.-M. and Patt, Y.N., "HPSm2: A Refined Single-Chip Microengine," *HICSS '88*, pp. 30-40, 1988.

Kateveris, Hardware Support "Thesis," p. 138-145 (1984).

Melvin, S. and Patt, Y., "Exploiting Fine-Grained Parallelism Through a Combination of Hardware and Software Techniques," *The 18th Annual International Symposium on Computer Architecture*, ACM SIGARCH, vol. 19, No. 3, pp. 287-296 (May 1991).

Patt, Y. et al., "Experiments with HPS, A Restricted Data Flow Microarchitecture for High Performance Computers," IEEE, pp. 254-258 (1986).

Patt, Y.N. et al., "Run-Time Generation of HPS Microinstructions From a VAX Instruction Stream," IEEE, pp. 75-81 (Oct. 1986).

Swensen, J.A. and Patt, Y.N., "Hierarchical Registers for Scientific Computers," *Conference Proceedings: 1988 International Conference on Supercomputing*, ACM, pp. 346-353 (Jul. 4-8, 1988).

Uvieghara, G.A. et al., "An Experimental Single-Chip Data Flow CPU," *Symposium on ULSI Circuits Design Digest of Technical Papers*, 2 pages (May 1990).

Uvieghara, G.A. et al., "An Experimental Single-Chip Data Flow CPU," *IEEE Journal of Solid-State Circuits*, IEEE, vol. 27, No. 1, pp. 17-28 (Jan. 1992).

Wilson, J.E. et al., "On Tuning the Microarchitecture of an HPS Implementation of the VAX," *Proceedings of the 20th Annual Workshop on Microprogramming*, IEEE Computer Society, pp. 162-167 (Dec. 1-4, 1987).

Adams, R.G. et al., "Utilising low level parallelism in general purpose code: the HARP project," *Microprocessors and Microprogramming*, vol. 29, No. 3, pp. 137-149, Oct. 1990.

*Convex Architecture Handbook, Version 1*, Convex Computer Corporation, 1984.

Johnson, M., *Super-scalar Microprocessor Design*, Prentice-Hall, Englewood Cliffs, NJ, 1991.

Maejima et al., "A 16-bit Microprocessor with Multi-Register Bank Architecture," *Proc. Fall Joint Computer Conference*, pp. 1014-1019, Nov. 2-6, 1986.

Maly, W. et al., "Memory Chip for 24-Port Global Register File," *Custom Integrated Circuits Conference, Proceedings of the IEEE*, pp. 15.5.1-15.5.4, May 12, 1991.

Myers, G. et al., *The 80960 Microprocessor Architecture*, John Wiley & Sons, Inc., New York, NY, 1988.

*Third-Generation TMS320 User's Guide*, Texas Instruments, 1988.

Vin, H. et al., "Instruction Scheduling in High-Performance Architectures - MIDR Algorithm," *CIPS Edmonton '88, Chaos into Order, Proceedings*, Edmonton, Alta., Canada, pp. 60-75, Nov. 7, 1988.

*Complaint*, 7 pages, dated Oct. 11, 2006, in *Transmeta Corporation v. Intel Corporation*, in the U.S. District Court for the District of Delaware, Case No. 1:06-cv-00633.

*First Amended Complaint*, 7 pages, dated Dec. 12, 2006, in *Transmeta Corporation v. Intel Corporation*, in the U.S. District Court for the District of Delaware.

*Intel Corporation's Answer, Affirmative Defenses, and Counterclaims to Transmeta's First Amended Complaint*, 27 pages, dated Jan. 9, 2007, in *Transmeta Corporation v. Intel Corporation*, in the U.S. District Court for the District of Delaware, Case No. 1:06-cv-00633.

*Intel Corporation's Responses to Transmeta's First Set of Interrogatories to Intel Corporation (Nos. 1-24) - Redacted Public Version*, 132 pages, dated May 18, 2007, in *Transmeta Corporation v. Intel Corporation*, in the U.S. District for the District of Delaware, Case No. 1:06-cv-00633.

*Intel Corporation's Supplemental Responses to Transmeta Interrogatory Nos. 8, 9, 12, 19, and 21-23 - Redacted Public Version*, 27 pages, dated Aug. 23, 2007, in *Transmeta Corporation v. Intel Corporation*, in the U.S. District for the District of Delaware, Case No. 1:06-cv-00633.

*Intel Corporation's Opening Claim Construction Brief*, 76 pages, dated Oct. 19, 2007, in *Transmeta Corporation v. Intel Corporation*, in the U.S. District Court for the District of Delaware, Case No. 1:06-cv-00633.

*Transmeta Corporation's Opening Claim Construction Brief*, 66 pages, dated Oct. 19, 2007, in *Transmeta Corporation v. Intel Corporation*, in the U.S. District for the District of Delaware, Case No. 1:06-cv-00633.

Paper No. 28 (Office Action dated Jun. 19, 1996) from U.S. Appl. No. 08/481,146.

Paper No. 32 (Office Action dated Nov. 18, 1996) from U.S. Appl. No. 08/481,146.

*Order Granting Request for Ex Parte Reexamination*, mailed May 11, 2007 in Control U.S. Appl. No. 90/008,573, 17 pages.

*Order Granting Request for Ex Parte Reexamination*, mailed Aug. 13, 2007 in Control U.S. Appl. No. 90/008,691, 20 pages.

*Order Granting Request for Ex Parte Reexamination*, mailed Aug. 29, 2007 in Control U.S. Appl. No. 90/008,712, 16 pages.

Stipulation of Dismissal, 1 page, dated Jan. 31, 2008, in *Transmeta Corporation v. Intel Corporation*, in the U.S. Distrcit Court for the District of Delaware Case No. 1:06-cv-00633.

Order Granting Request for Ex Parte Reexamination, mailed Jun. 12, 2007 in Control U.S. Appl. No. 90/008,585, 19 pages.

Order Granting Request for Ex Parte Reexamination, mailed May 11, 2007 in Control U.S. Appl. No. 90/008,569, 27 pages.

Order Granting Request for Ex Parte Reexamination, mailed Jun. 16, 2007 in Control U.S. Appl. No. 90/008,644, 35 pages.

8-Bit Embedded Controller Handbook, Intel 1989, pp. 1-1-1-19 and 3-1-3-37.

Albert, AJ, "User Configurable Local Storage Registers," IBM Technical Disclosure Bulletin, pp. 3971-3975 (1976).

Baker, T., "Headroom and Legroom in the 80960 Architecture," COMPCON Spring '90: Thirty-Fifth IEEE Computer Society International Conference, IEEE Computer Society, 1990, pp. 299-306.

Bakoglu et al., "IBM Second-Generation RISC Machine Organization," 1990, IEEE, pp. 138-142.

Birman, M. et al., "Design of a High-Speed Arithmetic Datapath," Proceedings 1988 IEEE International Conference on Computer Design: VLSI in Computers & Processors, IEEE, Oct. 3-5, 1988, pp. 214-216.

Colwell, R. et al., "Architecture and implementation VLIW supercomputer," Proc. Of the 1990 Conf. on Supercomputing (1990), pp. 910-919.

Fairchild Semiconductor "Clipper 32-Bit Microprocessor - User's Manual," Prentice-Hall, Inc. (1987), entire book.

Findlay, et al., "HARP: A VLIW RISC Processor", Proceeding of 5th Annual European Computer Conference on Advanced Computer Technology, Reliable Systems and Applications, May 16, 1991, pp. 368-372.

Groves, R.D. and Oehler, R., "An IBM Second Generation RISC Processor Architecture," COMPCON 90: 35th IEEE Computer Society International Conference, IEEE, Feb. 26, 1990, pp. 166-172.

Hara et al., "Branch Pipeline of DSNS Superscalar Processor Prototype", Computer Architecture, 86-3, Jan. 24, 1991, pp. 1-8 in Japanese language (with English language translation, 20 pages).

Huang, J.W. et al., "Dynamically Reconfigurable Vectors," IBM Technical Disclosure Bulletin, pp. 3480-3483 (Dec. 1980).

Hunter, C., Series 32000 Programmer's Reference Manual, Prentice-Hall Inc., Englewood Cliffs, NJ, 1987, pp. 2-4, 2-21, 2-23, 6-14 and 6-126.

Hwang, K. et al., "Computer Architecture and Parallel Processing," Pipeline Computers and Vectorization Methods, McGraw Hill, Inc., 1984, pp. 264-280.

Intrater et al., "A Superscalar Microprocessor," IEEE Proceedings of the 17th Convention of Electrical & Electronics Engineers In Israel, pp. 267-270 (Mar. 1991).

Jelemensky, "New Microcomputer Features Advanced Hardware For Real-Time Control Applications," Electro Conference Record, vol. 14, Apr. 11, 1989, Los Angeles, CA, pp. 1-9.

Johnson, M. Superscalar Microprocessor Design, Prentice-Hall, pp. vii-xi and 87-125 (1991).

Kanai, T. et al., "A 16-bit Microcomputer μPD70423 for Serial Communication," NEC Research & Development, NEC, vol. 32, No. 3, Jul. 1991, pp. 350-360.

Kogge, P.M., "The Architecture of Pipelined Computers," Static Pipelined Systems Vector Processors, Hemisphere Publishing Corporation, 1981, pp. 167-172.

Lee, Ruby B., "Precision Architecture," Computer, Jan. 1989, pp. 78-91.

Margulis, N., "i860 microprocessor internal architecture," Microprocessors and Microsystems, Butterworth & Co. Ltd., vol. 14, No. 2, pp. 89-96 (Mar. 1990).

McGeady, S., "The i960A Superscalar Implementation of the 80960 Architecture," IEEE, 1990, pp. 232-240.

English Language Abstract for JP Patent Publication No. 6-019707.

Miller et al., "Exploiting Large Register Sets," Microprocessors and Microsystems, Butterworth-Heinemann Ltd., vol. 14, No. 6, Jul. 1990, pp. 333-340.

Molnar, K. et al., "A 40 MHz 64-Bit Floating-Point Co-Processor," 1989 IEEE International Solid-State Circuits Confernce, IEEE, Feb. 1989, pp. 48, 49 and 287.

Nakano, H. et al., "A 80 Mflops 64-bit Microprocessor for Parallel Computer," 1991, IEEE, pp. 15.2.1-15.2.4.

Odnert, D. et al., "Architecture and Compiler Enhancements for PA-RISC Workstations," Proceedings from IEEE Compcon, Feb. 25-Mar. 1, 1991, San Francisco, CA, pp. 214-218.
Patent Abstracts of Japan, vol. 010, No. 089, Apr. 1986, & JP, A, 60 225 943 (Hitachi Seisakusho K K) Nov. 11, 1985.
Patterson, D. A. and Séquin, C.H., "A VLSI RISC," Computer, IEEE, vol. 15, No. 9, Sep. 1982, pp. 8-18 and 20-21.
Russell, R. M., "The CRAY-1 Computer System," Association for Computing Machinery, Inc., vol. 21, No. 1, Jan. 1978, pp. 63-72.
Steven, G.B. et al., "HARP: A parallel pipelined RISC processor," Microprocessors and Microsystems, Butterworth & Co. Ltd., vol. 13, No. 9, Nov. 1989, pp. 579-586.
Weiss, R., "Third-Generation RISC Processors", On Special Report, Mar. 30, 1992, pp. 96-108.
English Langauge Abstract for JP Patent Publication No. 1-142831, (1 page).
English Langauge Abstract for JP Patent Publication No. 3-035324, (1 page).
English Langauge Abstract for JP Patent Publication No. 5-197544.
English Langauge Abstract for JP Patent Publication No. 63-192135, (1 page).
English Langauge Abstract for JP Patent Publication No. 1-142831, (1 page).1-199233
English Langauge Abstract for JP Patent Publication No. 02-211534.
English Langauge Abstract for JP Patent Publication No. 02-226342.
English Langauge Abstract for JP Patent Publication No. 2-118757.
English Langauge Abstract for JP Patent Publication No. 2-224025.
English Langauge Abstract for JP Patent Publication No. 57-057345.
English Langauge Abstract for JP Patent Publication No. 60-144830.
English Langauge Abstract for JP Patent Publication No. 61-40650.
English Langauge Abstract for JP Patent Publication No. 62-242243.
English Langauge Abstract for JP Patent Publication No. 61-107434.
English Langauge Abstract for JP Patent Publication No. 2-048732.
English Langauge Abstract for JP Patent Publication No. 3-218524.
English Langauge Abstract for JP Patent Publication No. 4-054638.
English Langauge Abstract for JP Patent Publication No. 4-096132.
English abstract for WO 90/10267, which is a direct counterpart of JP Patent Publication No. 4-503582.
Melear, "The Design of the 88000 RISC Family," IEEE Micro, vol. 9, No. 2, pp. 26-38 (Apr. 1989).

* cited by examiner

SYSTEM AND METHOD FOR REGISTER RENAMING

CROSS-REFERENCE TO RELATED APPLICATIONS

This application is a continuation of application Ser. No. 10/222,935, filed Aug. 19, 2002, now U.S. Pat. No. 6,970,995, which is a continuation of application No. 10/083,143, filed Feb. 27, 2002, now U.S. Pat. No. 6,922,772, which is a continuation of application Ser. No. 09/826,211, filed Apr. 5, 2001, now U.S. Pat. 6,408,375, which is a continuation of application Ser. No. 09/399,000, filed Sep. 17, 1999, now U.S. Pat. No. 6,272,617, which is a continuation of application Ser. No. 09/063,059, filed Apr. 21, 1998, now U.S. Pat. 6,138,231, which is a continuation of application Ser. No. 08/698,211, filed Aug. 15, 1996, now U.S. Pat. 5,809,276, which is a continuation of application Ser. No. 08/478,531, filed Jun. 7, 1995, now U.S. Pat. No. 5,590,295, which is a continuation of application Ser. No. 07/997,948, filed Dec. 31, 1992, now abandoned.

The following are Related Applications:

Superscalar RISC Instruction Scheduling, Ser. No. 08/219,425, filed Mar. 29, 1994, now U.S. Pat. No. 5,497,499, which is a file wrapper continuation of Ser. No. 07/860,719, filed Mar. 31, 1992, now abandoned;

Semiconductor Floor Plan for a Register Renaming Circuit, Ser. No. 07/860,718, filed Mar. 31, 1992, now U.S. Pat. No. 5,371,684;

System and Method for Retiring Instructions in a Superscalar Microprocessor, Ser. No. 08/481,146, filed Jun. 7, 1995, now U.S. Pat. No. 5,826,055, which is a file wrapper continuation of Ser. No. 07/877,451, filed May 1, 1992, now abandoned;

High-Performance, Superscalar-Based Computer System with Out-of-Order Instruction Execution, Ser. No. 07/817,810, filed Jan. 8, 1992, now U.S. Pat. No. 5,539,911, which is a continuation of Ser. No. 07/727,006, filed Jul. 8, 1991, now abandoned;

High-Performance, Superscalar-Based Computer System with Out-of-Order Execution and Concurrent Results Distribution, Ser. No. 08/397,016, filed Mar. 1, 1995, now U.S. Pat. No. 5,560,032, which is a file wrapper continuation of Ser. No. 07/817,809, filed Jan. 8, 1992, now abandoned, which is a continuation of application Ser. No. 07/727,058, filed Jul. 8, 1991, now abandoned.

The above cited patent documents are incorporated herein by reference.

BACKGROUND OF THE INVENTION

1. Field of the Invention

The present invention relates to superscalar reduced instruction set computers (RISC), more particularly, the present invention relates to a register renaming circuit for superscalar RISC computers.

2. Background Art

A more detailed description of some of the basic concepts discussed in this application is found in a number of references, including Mike Johnson, *Superscalar Microprocessor Design* (Prentice-Hall, Inc., Englewood Cliffs, N.J., 1991) (hereafter Johnson); John L. Hennessy et al., *Computer Architecture—A Quantitative Approach* (Morgan Kaufmann Publishers, Inc., San Mateo, Calif., 1990). Johnson's text, particularly Chapters 2, 6 and 7 provide an excellent discussion of the register renaming issues addressed by the present invention.

A major consideration in a superscalar RISC processor is how to execute multiple instructions in parallel and out-of-order, without incurring data errors due to dependencies inherent in such execution. Data dependency checking, register renaming and instruction scheduling are integral aspects of the solution. A detailed discussion of storage conflicts, register renaming and dependency mechanisms is found in related U.S. Pat. No. 5,497,499 to Garg et al. (hereinafter referred to as the '499 patent).

The '499 patent discloses a register renaming circuit (RRC) having a fixed instruction window. In the fixed instruction window, dependency checking and resource assignment is done on the same set of instructions until all the instructions in the set are completed. This means that there is a fixed relationship between each instruction's position in the instruction stream and the instruction number used for resource assignment.

For example, in an instruction stream with an instruction window of 4 instructions every fourth instruction maps to instruction A (i.e., the first instruction in the window). This technique makes re-mapping of instruction very simple. In this case a 4-to-1 multiplexer is all that is necessary for each resource to forward a single instruction to that resource. However, the fixed format requires that the instruction window be advanced by a fixed amount, which results in somewhat inefficient processing.

When an instruction retires (an instruction can retire after it has been executed without exception and when all previous instructions have been executed and their results are stored in the register file), its result is moved into a main register file (i.e., the programmable visible register file) and if any instructions were dependent on that instruction, their renamed sources are not needed anymore. In the architecture disclosed in the '499 patent, all instructions' sources are renamed every cycle. This renaming technique requires many comparators for performing the dependency checks. More specifically, the source register addresses of each instruction must be compared to the destination register addresses of all preceding instructions in the instruction window every cycle.

What is desired is a more efficient register renaming technique requiring less comparators and permitting the processor to execute instructions in parallel and out of order.

SUMMARY OF THE INVENTION

The present invention is directed to a system and method for performing register renaming of source registers on a per-cycle basis only for new instructions added to the instruction window in that cycle. The present invention thus reduces the total number of dependency check comparators necessary for performing register renaming.

A preferred embodiment of the present invention comprises storing the instructions in a variable advance instruction window, and assigning a tag to each instruction in the instruction window. The tag of each retired instruction is assigned to the next new instruction to be added to the instruction window. The results of instructions executed by the processor are stored in a temp buffer according to their corresponding tags to avoid output dependencies and anti-dependencies. The temp buffer therefore permits the processor to execute instructions out of order and in parallel.

Data dependency checks are performed only for each new instruction added to the instruction window. Operands of the instructions having input dependencies are often located in the temporary buffer, and the source register addresses of those instructions having dependencies are renamed according to the tags of the operands located in the temp buffer. The renamed source register addresses are then stored in a rename result register file.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings. A brief description of the drawings is as follows.

DETAILED DESCRIPTION OF THE INVENTION

Figure 1:
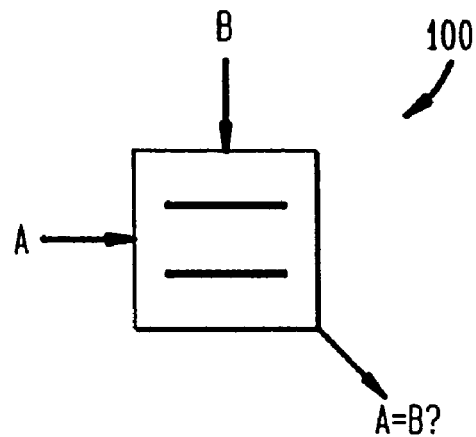
FIG. 1 shows a representative block diagram of a DDC equal compare circuit of the present invention.

The terms processor, CPU, and digital processor are often used interchangeably in this field. The term "processor' is used hereafter with the understanding that other similar terms could be substituted therefore without changing the underlying meaning of this disclosure.

The present invention is directed to a Register Renaming Circuit (RRC) which is part of a processor. The RRC permits the processor to execute instructions in parallel and out of order. In a preferred embodiment of the present invention, the processor has a variable advance instruction window (VAIW) for holding instructions from an instruction stream prior to execution. The RRC can be used with a fixed advance instruction window as well.

The VAIW in a preferred embodiment holds eight instructions, and up to four new instructions can be added to the top four locations of the VAIW in any one cycle.

In a VAIW, any one of instructions 10, 11, 12 and 13 can be mapped into the first location in the window (location A, for example). Tags are assigned to the instructions as the instructions enter the VAIW. The tags are stored in a first-in-first-out buffer (hereafter called a FIFO; not shown).

As an instruction advances in the VAIW by a variable amount, the tag associated with that instruction also advances in the FIFO by the same amount. When a new instruction enters the VAIW it is assigned the tag of the most recent instruction to leave the VAIW, thus tags are reused. Instructions can leave the VAIW by either retiring, or they can be flushed out if a branch is taken.

The tag of each instruction leaving the instruction window is returned to the head of the FIFO and re-used by the new instruction added to the window. However, the first instruction and tag in the FIFO always progress in order, because instructions always retire in order.

According to the present invention only new instructions in the VAIW need be checked for dependencies. This eliminates the need for excess comparators. New instructions in the window are therefore passed through the RRC. In order to reduce complexity by renaming the source registers for only those instructions that are new in the instruction window on a per-cycle basis, two assumptions are made:

1. Each instruction's tag remains constant as long as the instruction remains in the window. This tag is also associated with the location in a temp buffer (discussed below) that the corresponding instruction's output will be stored.

2. At most, only a subset ($I_n$ to $I_{n-1}$) of the instructions in the window ($I_n$ to $I_0$) can be new in any given cycle.

In a preferred embodiment of the present invention, the temp buffer (or temporary buffer) is part of the main register file. The register file contains 40 registers; registers 0-31 are the main registers (commonly called the programmer visible registers), and registers 32-39 comprise the temp buffer. The temp buffer and main register file share the same read ports. Thus, to read the data from temp buffer address 4, {100100} would be the address on the read address port, for example.

In order to perform dependency checking in the present invention, an RRC Inputs Register File (RIRF) is used to hold the source and destination register addresses of all instructions in the instruction window. As new instructions enter the window an instruction fetch unit (IFU: not shown) sends the instructions' source and destination register addresses to the RIRF. The source and destination register addresses are stored in the RIRF by tag number. The RIRF has one output for each instruction in the window and the source and destination register addresses are read from the RIRF and sent to the RRC.

The RRC performs the data dependency checking and the register renaming. The data dependency check is done by the Data Dependency Checker (DDC) and the rename is performed by the Tag Assignment Logic (TAL).

There are three kinds of data dependencies: input dependencies, anti-dependencies and output dependencies. An instruction is input dependent on a previous instruction if one of its inputs is the previous instruction's output; an instruction is anti-dependent if the address of one of its source registers (RS) is the same as the address of a later instruction's destination register (RD); and an instruction is output dependent if the address of its destination register is the same as the address of another instruction's destination register.

Dependencies limit the amount of parallelism that a computer can exploit. For example, if instruction A is input dependent on instruction B, then instruction A must not be executed until after instruction B is executed. Also, if instruction A and B are output dependent and instruction A comes first in the program, then instruction A's result must be written to the main register file before instruction B's. Finally, if instruction A is anti-dependent on instruction B, then instruction B's result must not be written to the main register file until after instruction A has begun executing. Output and anti-dependencies are usually avoided by use of the temp buffer. Input dependencies cannot be avoided and are located by the DDC.

The DDC locates input dependencies by comparing the register file addresses of each instruction's sources with the register file addresses of each previous instruction's destination. If an instruction's input data comes from the same register file address as a previous instruction's output data, then they are dependent (the term "dependent" will be used to mean "input dependent" for the remainder of this description).

It is possible that an instruction can be dependent on several previous instructions. When this happens, the RRC assumes that the programmer intended that the instruction be dependent on the most previous instruction. For example, if instruction 5 depends on instructions 3 and 1, then the RRC would assume that the programmer intended instruction 5 to use instruction 3's results and not instruction 1's.

Figure 2:
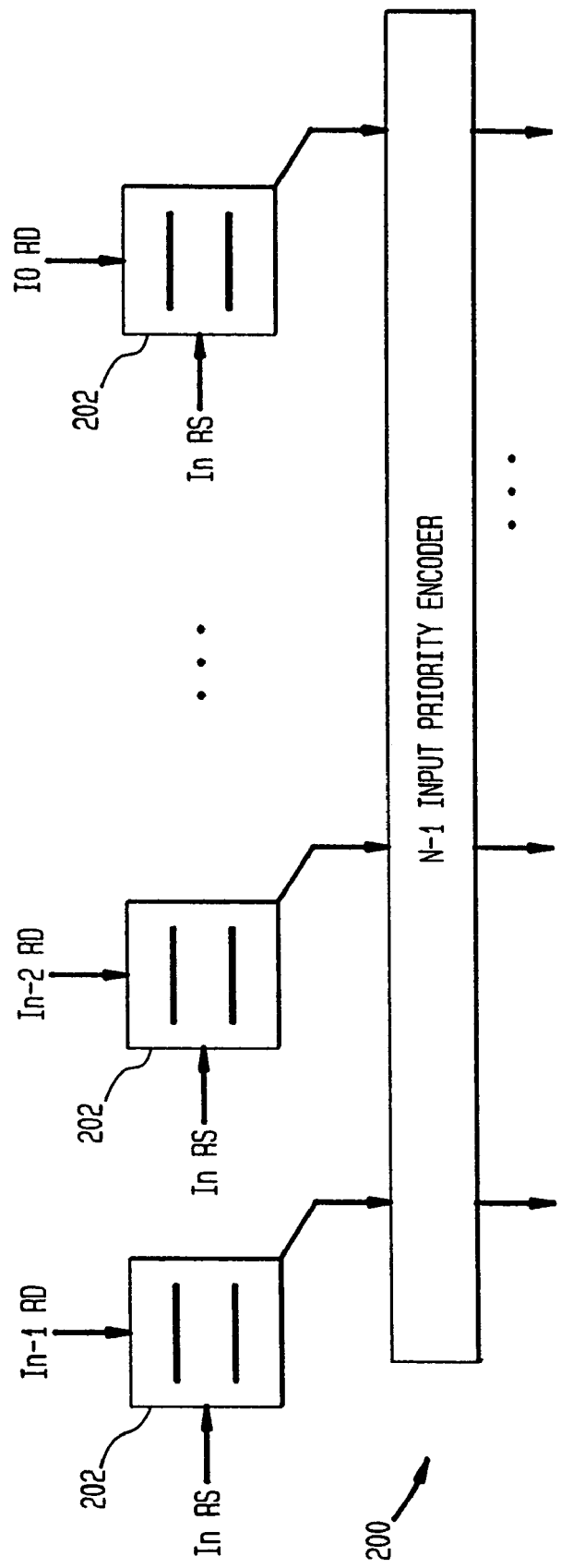
FIG. 2 shows a representative block diagram of an N-1 input priority encoder of the present invention.

A DDC equal compare circuit 100 for checking dependencies between instructions A and B in accordance with the present invention is shown in FIG. 1. The output (A=B?) of the DDC equal compare circuit 100 is sent to a priority encoder. A n-1 input priority encoder 200 is shown in FIG. 2. Priority encoder 200 checks the highest priority dependency for instruction n's source ($I_nRS$). The inputs at the top of priority encoder 200 are the data dependency comparisons of instruction n's source ($I_nRS$) with the destinations of all previous instructions ($I_{n-1}RD$-$I_0RD$), as determined by equal compare circuits 202. For example, if the $x^{th}$ bit of the priority encoder output is asserted, then instruction n is input dependent on instruction x.

The present invention avoids the problems caused by output and anti-dependencies by storing the results of all instructions in the temp buffer and then moving the results into the main register file in program order. For example, if instruction 1 finishes before instruction 0, its result will be written to the register file after instruction 0's result is written to the register file. The use of the temp buffer allows the processor to execute instructions out of order and in parallel. Since the results of the instructions are moved to the main register file in order, output and anti-dependencies do not cause a problem.

Since the result of an instruction can sit in the temp buffer for a long time before it gets moved to the main register file, instructions that are dependent on that instruction will also have to wait. In order to improve performance, the present invention includes a means with which to use data that is in the temp buffer. That means is the Tag Assignment Logic (TAL).

The TAL determines the location in the temp buffer of the operands of dependent instructions. As noted above all instructions are assigned a tag that remains constant while the instruction is in the window, and there is one location in the temp buffer for each instruction in the window. Thus, the processor implementing the present invention uses the tag of an instruction as the temp buffer address of that instruction's result.

Since the TAL knows where every instruction's result is stored, and since it also knows (from tile DDC) where the dependencies are between instructions, tile TAL can determine the location in the temp buffer of each instruction's inputs.

Figure 3:
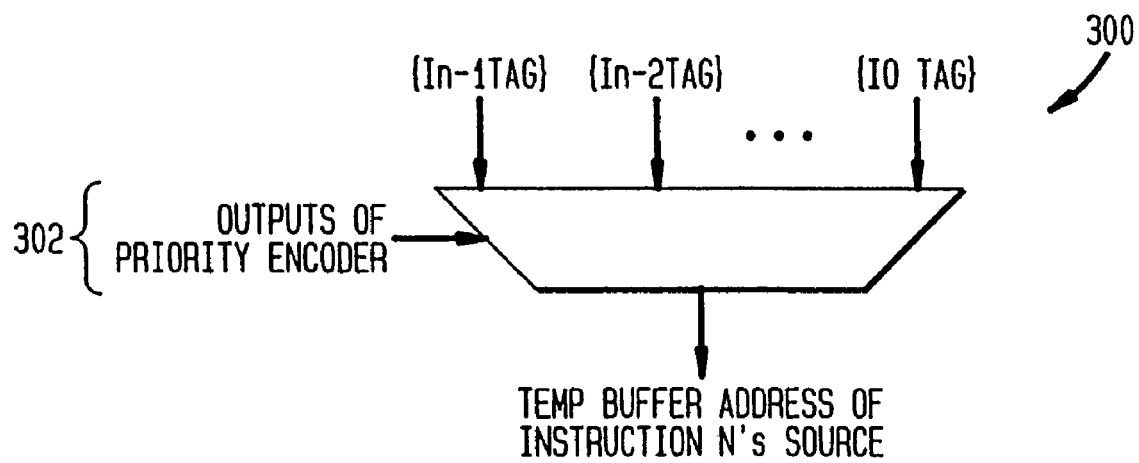
FIG. 3 shows a representative block diagram of the tag assignment logic (TAL) of the present invention.

A representative block diagram of a TAL 300 used to determine the location of instruction n's source (RS) is shown in FIG. 3. The outputs of the priority encoder are connected as select lines (as shown generally at 302) to select the $I_{n-1}$ through $I_0$ TAGs, which are input at the top of TAL 300. TAL 300 thus outputs the temp buffer address of instruction n's source.

Figure 4:
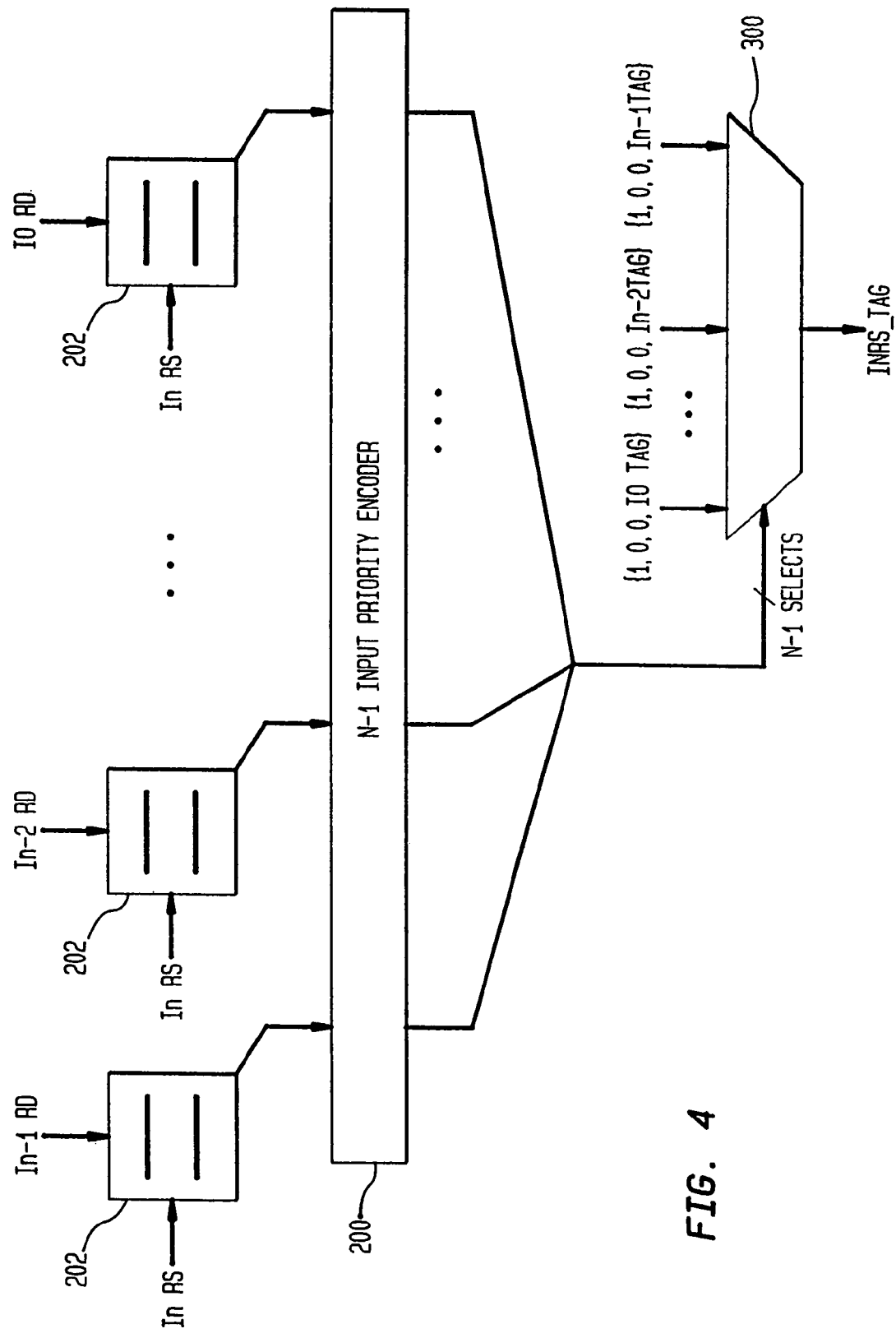
FIG. 4 shows a representative block diagram of the TAL and priority encoder circuit of the present invention.

A complete rename circuit for instruction n's source register is shown in FIG. 4. The term for the renamed register file address of instruction n's source is INRS_TAG.

Figure 5A:
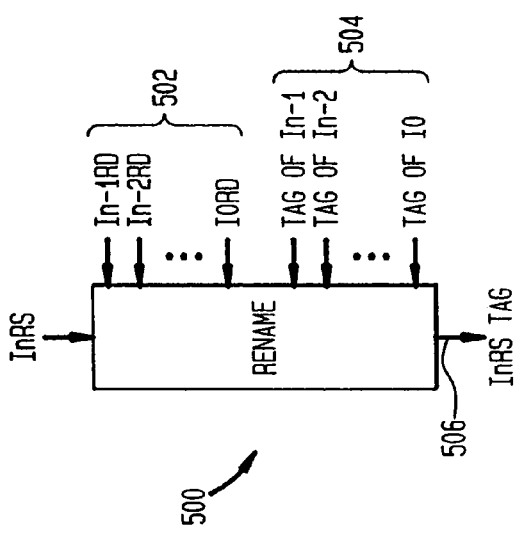
FIGS. 5A and 5B show representative block diagrams of the register rename block of the present invention.

A representative block diagram of a rename circuit 500 of the present embodiment is shown in FIG. 5A. The address of a new instruction's source register ($I_nRS$) is shown input at the top of the rename circuit 500. The destination register addresses of all preceding instructions in the window are input to rename circuit 500, as shown generally at 502. In addition, all the tags of all preceding instructions in the window are input to rename circuit 500, as shown generally at 504. Rename circuit 500 outputs a tag for the new instruction's source register ($I_nRS$), as shown at 506. The new $I_nRS$ tag is assigned by rename circuit 500 according to any dependencies, as discussed above in connection with the other embodiment(s). If the instruction has no dependencies the address input at the top input is simply passed to the output. Given a VAIW of 8 instructions and assuming that the temp buffers have the 8 highest addresses of the 40 total registers, the most significant bit of the rename circuit 500 output indicates whether the result is in the main register file or the temp buffer.

Figure 5B:
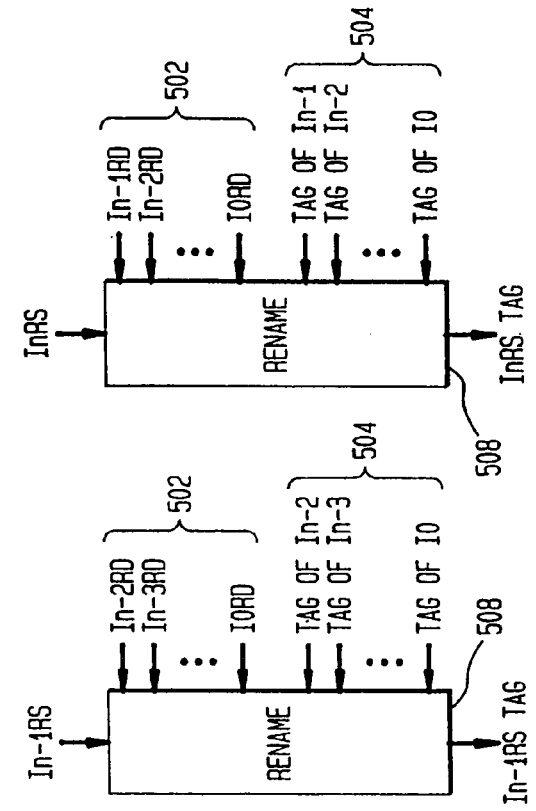
Figure 5B:
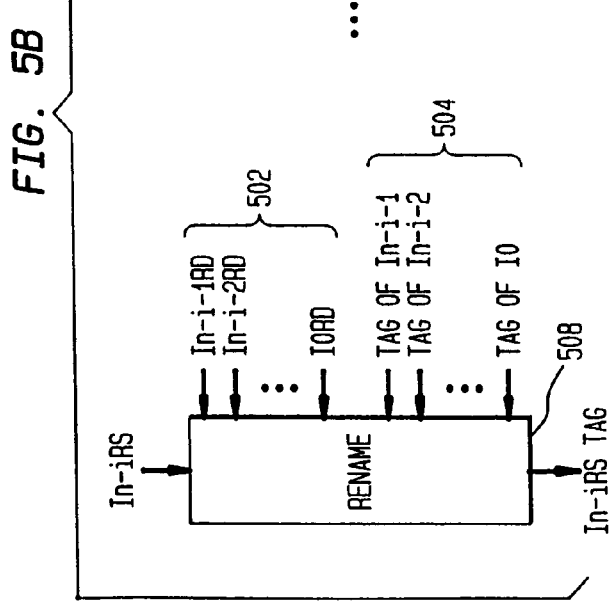

Renaming circuits 508 for renaming the source registers of a plurality of instructions are shown in FIG. 5B. The number "i" in FIG. 5B corresponds to the maximum number of instructions in the window that can be new. In a preferred embodiment "i" is equal to 3; thus requiring 4 rename circuits.

Because renaming only happens when a new instruction enters the window, some technique is needed to store the outputs of the RRC. One technique would be to store the RRC results in a FIFO whenever the instruction window advances. The present embodiment, however, stores the renamed registers in a separate register file (discussed below). Since each instruction's tag stays constant, the renamed source register results from the rename circuits can be stored by tag number. The register file for storing the rename results therefore has one write port for each new instruction in the window and one read port for each instruction in the window.

Figure 6:
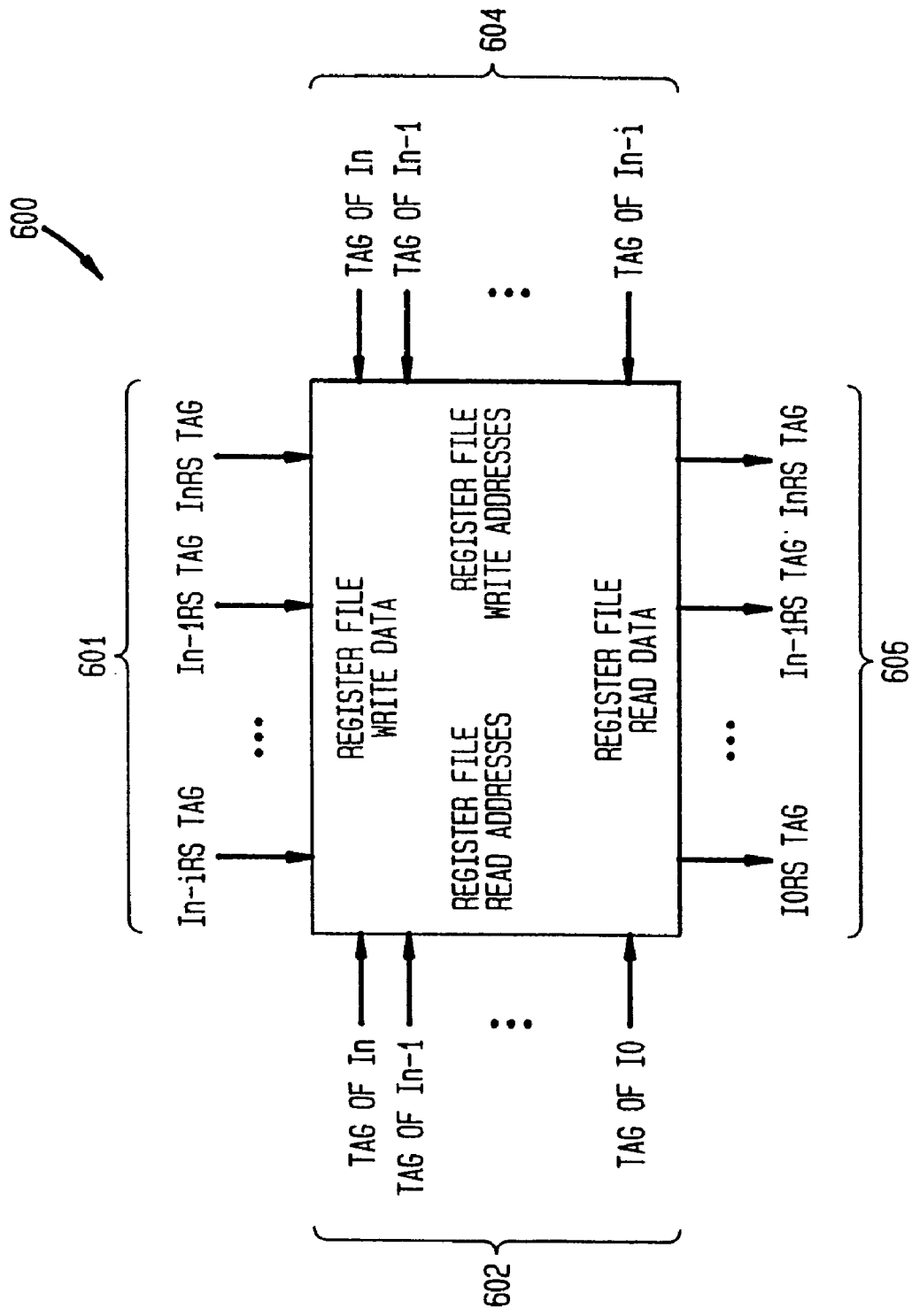
FIG. 6 shows a representative block diagram of the register rename register file of the present invention.
Figure 7:
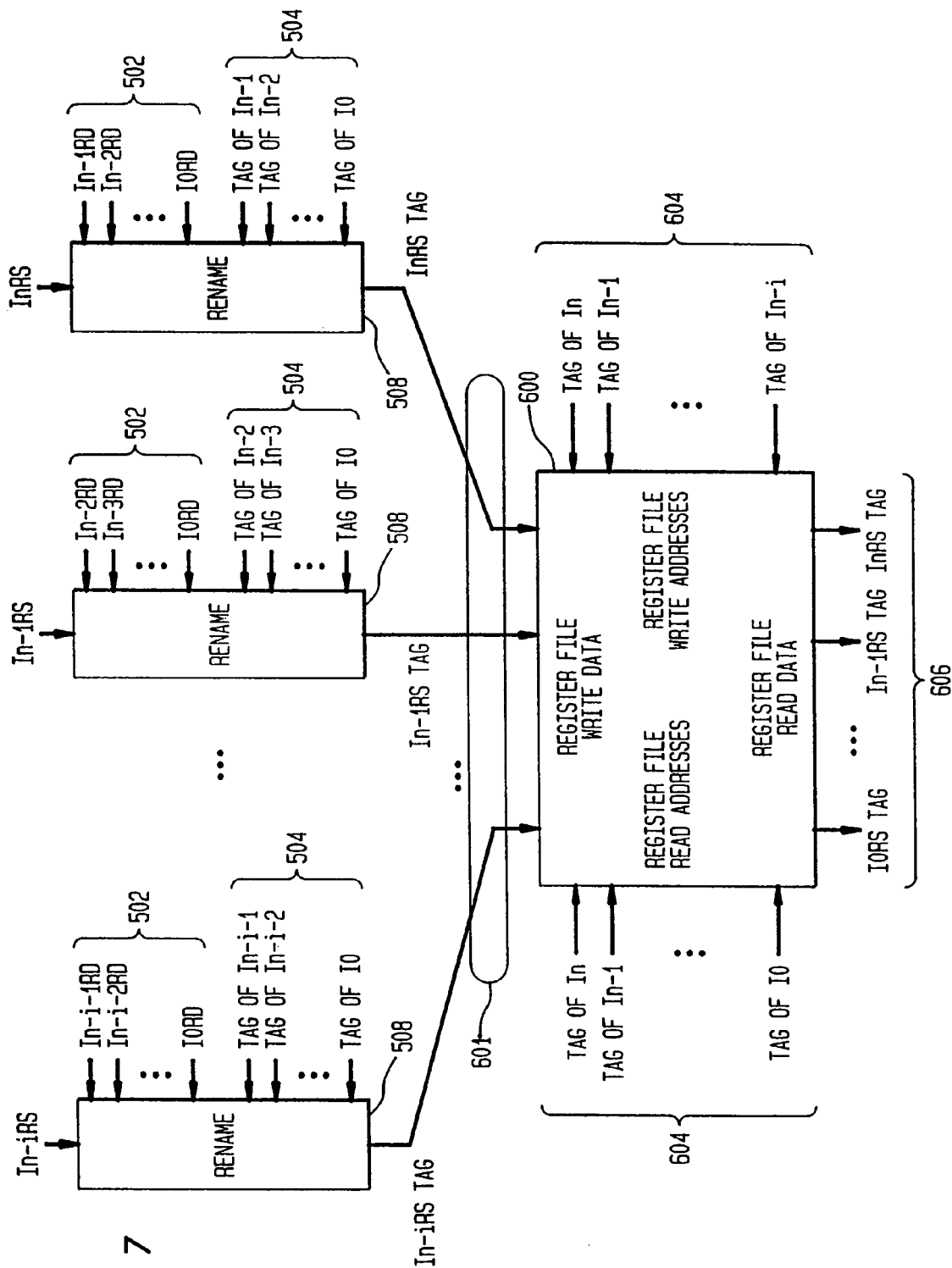
FIG. 7 shows a representative block diagram of the interconnection of the blocks of FIGS. 5B and 6.

A representative block diagram of a rename result register file (RRRF) 600 is shown in FIG. 6. The renamed results are input as "WRITE DATA", as shown generally at 601. "READ ADDRESS" and "WRITE ADDRESS" tags are input to register file 600, as shown generally at 602 and 604, respectively. Renamed results for all the sources of all instructions in the window are available as "READ DATA", as shown generally at 606. FIG. 7 shows rename circuits 508 connected to rename result register file 600.

When an instruction retires its result is moved into the main register file. If any instructions were dependent on that instruction, their renamed sources are not needed anymore.

The area to which new instructions can enter the instruction window (in this embodiment the area is the top four locations), are those locations which are register renamed. Once an instruction leaves that area of the window it is no longer renamed. The RRC of the present invention renames an instruction's source register when it enters the window, so there needs to be a mechanism to detect which instructions' sources have been moved to the register file and to replace the renamed source register address with the original source register address. The first part of that mechanism is called MONDEP (as in "monitor dependencies") and the second part is called RFMXING. In addition, a source register ready generator (RDY_GEN) is used to determine when each instruction's sources are available.

Figure 8:
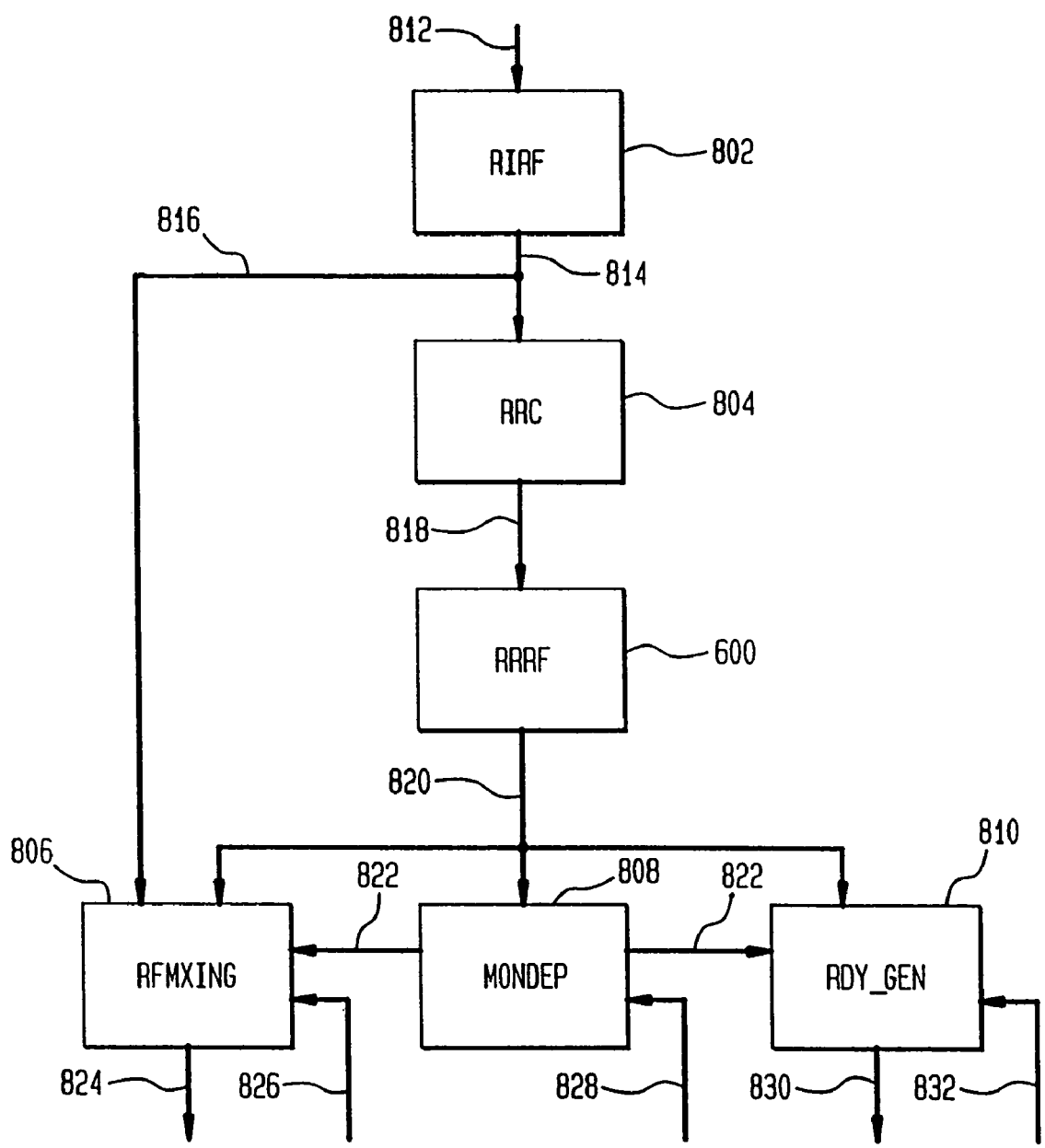
FIG. 8 shows a representative high level block diagram including the RRC of the present invention.

A representative high level block diagram of the RIRF, RRC, RRRF, MONDEP, RDY_GEN and RFMXING (labeled as 802, 804, 600, 806, 808 and 810, respectively) is shown in FIG. 8. Each block 802, 804, 600, 806, 808 and 810 receives the tags of all instructions in the instruction window from the tag FIFO (not shown). Implementation of the tag FIFO will become obvious to one skilled in the art.

Source and destination register addresses of new instructions from the IFU (not shown) are sent to RIRF 802 via a bus 812, and are accessed by RRC 804 via a bus 814. The source registers of all instructions are passed to RFMXING 806 via a bus 816. Renamed source registers of all instructions are stored in RRRF 600 via a bus 818. The stored renamed source registers of all instructions are passed to RFMXING 806, MONDEP 808 and RDY_GEN 810 via a bus 820.

MONDEP 808 determines which dependencies have disappeared by comparing the tags of retiring or recently-retired instructions with the lower three bits of the renamed sources of each instruction. Information regarding retired instructions is sent to MONDEP 808 via a bus 828 from a retirement unit (not shown; the details of a retirement unit that can be used to generate these signals is disclosed in related U.S. Pat. No. 5,826,055 to Wang et al.). If there is a match, then MONDEP 808 knows that the dependency has been removed and the outputs of MONDEP 808 outputs which instructions' inputs have been moved from the temp buffer to the register file. These output signals are sent to RFMXING 806 and RDY_GEN 810 via buses 822.

In a preferred embodiment of the present invention, the instruction window holds eight instructions. Each cycle, at most three of those instructions can be retired. In the cycle after an instruction is retired, its tag is moved to the top of the FIFO. Therefore, to check what dependencies have been removed, MONDEP 808 compares each of the renamed sources of each instruction with the tags of the top three instructions in the FIFO. In a further embodiment MONDEP 808 can compare each renamed source with the tags of the instructions at the bottom of the FIFO that are about to be retired.

MONDEP 808 outputs a bit for each source of each instruction and the bits are sent to RFMXING and RDY_GEN blocks in the RRC. These bits are asserted when an instruction's dependency goes away and remain asserted until the instruction is retired.

RDY_GEN 810 determines when each instruction's sources are available and outputs this information via a bus 830. The difference between MONDEP 808 and RDY_GEN 810 is MONDEP 808 only monitors when instructions retire. An instruction does not have to wait until another instruction retires to use its result;

it only needs to wait until it is done (an instruction is done when its result is entered into the temp buffer). Also, if an instruction has no dependencies, then it can be executed immediately. Information concerning whether an instruction is "done" is input to RDY_GEN 810 via a bus 832. "Done" signals come from done control logic (not shown). In connection with the present invention, the term "done" means the result of the instruction is in a temporary buffer or otherwise available at the output of a functional unit. (An example of done control logic may be found in the '499 patent.)

RDY_GEN 810 has one output for each source of all instructions in the window. The output for a particular instruction's source is assured if one of three conditions is true:

1. The source was never dependent on any other instruction.

2. The instruction that the source was dependent on is done and its result is in the temp buffer.

3. The instruction that the source was dependent on is retired and its result has been moved from the temp buffer to the register file.

These outputs 830 of RDY_GEN 810 go to the ISSUER which determines which instruction(s) is to issued based on functional unit availability and lack of dependencies.

RFMXING 806 is used to generate the read addresses of the register files. It contains a collection of muxes for each read port of each register file. These muxes are selected by the outputs of the ISSUER and MONDEP 808. Read addresses for each port of each register file are output by RFMXING 806, via a bus 824. (A processor may have a separate register file for a floating point subprocessor and an integer subprocessor, for example.)

Figure 9:
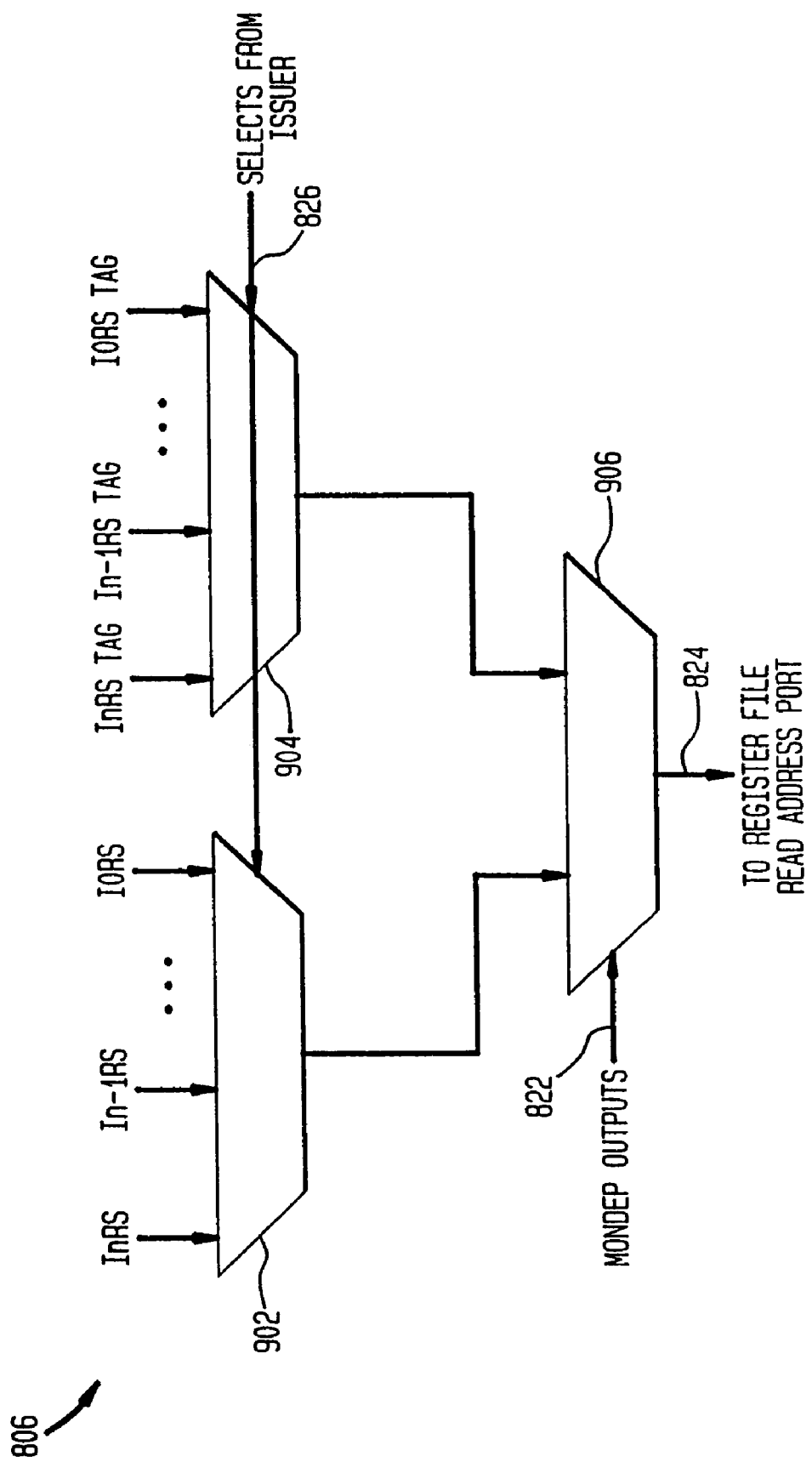
FIG. 9 shows a representative block diagram of a circuit to generate the address for one register file port.

The circuit to generate the address for one register file port is shown in FIG. 9. The ISSUER decides which instructions to execute and which register file ports to use for each instruction by sending select signals via a bus 826 to RFMXING 806. MONDEP 808 decides which instructions sources have been moved from the register file and which are still inside the temp buffer via bus 822. For example, if one assumes that the ISSUER decides to execute instruction $I_n$ and $I_n$ is dependent on $I_{n-1}$; then the ISSUER will select (via select signals 826) two top multiplexers (mux) 902 and 904 and choose $I_n$RS ($I_n$'s original source register address) and $I_n$RS_TAG. If it has, MONDEP 808 will select, using a third mux 906, the output of mux 902 on the left and send $I_n$RS to the register file. If not, it will choose the output of mux 904 on the right and send the $I_n$RS_TAG to the register file.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. All cited patent documents and publications in the above description are incorporated herein by reference.

What is claimed is:

1. A system for renaming source registers of instructions to be executed in a microprocessor, the system comprising:
    an instruction window comprising a plurality of storage locations each of which stores a single instruction that may be issued during a single processor cycle, wherein only a subset of the plurality of storage locations may be filled with new instructions in a single processor cycle; and
    a plurality of register renaming circuits, wherein each of the plurality of register renaming circuits is uniquely associated with a storage location in the subset of the plurality of storage locations and configured to determine if a new instruction stored in the corresponding storage location is dependent on any older instructions in the instruction window and to output a renamed source register address for the new instruction if such a dependency exists.

2. The system of claim 1, further comprising:
    control logic that assigns one of a plurality of tags to a new instruction in the instruction window, each of the plurality of tags uniquely identifying a register for storing a result corresponding to an instruction in the instruction window.

3. The system of claim 2, further comprising:
    a first-in-first-out (FIFO) buffer that stores the plurality of tags;
    wherein the control logic assigns a tag from the head of the FIFO buffer to the new instruction in the instruction window.

4. The system of claim 3, wherein the FIFO buffer includes:
    a plurality of slots equal in number to a predetermined size of the instruction window, each of the plurality of slots containing a unique one of the plurality of tags, wherein an order defined by positions of the plurality of tags in the FIFO buffer corresponds to an order of instructions in the instruction window.

5. The system of claim 2, wherein each of the plurality of register renaming circuits includes:

a data dependency checker that determines if the new instruction in the instruction window is dependent on an older instruction in the instruction window by comparing a source register address of the new instruction in the instruction window with a destination register address of the older instruction in the instruction window.

6. The system of claim 5, wherein the data dependency checker comprises:
a compare circuit that compares the source register address of the new instruction in the instruction window with the destination register address of the older instruction in the instruction window.

7. The system of claim 5, wherein each of the plurality of register renaming circuits further comprises:
tag assignment logic that outputs a renamed source register address for the new instruction in the instruction window, wherein the renamed source register address comprises a tag assigned to the older instruction in the instruction window if the new instruction in the instruction window is dependent on the older instruction in the instruction window.

8. The system of claim 7, further comprising:
a register file that stores a source register address and a destination register address for each instruction in the instruction window, the register file coupled to the data dependency checker for providing the source register address of the new instruction in the instruction window and the destination register address of the older instruction in the instruction window to the data dependency checker.

9. The system of claim 7, further comprising:
a register file comprising a write data port and a write address port;
wherein the tag assignment logic stores the renamed source register address in the register file by providing the renamed source register address to the write data port and by providing the tag assigned to the older instruction in the instruction window to the write address port if the new instruction in the instruction window is dependent on the older instruction in the instruction window.

10. The system of claim 9, wherein the register file further comprises:
a read data port and a read address port;
wherein the renamed source register address stored in the register file is accessed on the read data port by providing the tag associated with the new instruction in the instruction window to the read address port.

11. The system of claim 7, further comprising:
a retirement unit that determines whether the new instruction in the instruction window has retired.

12. The system of claim 11, further comprising:
logic that selects one of the register source address of the new instruction in the instruction window or the renamed register source address based on whether the new instruction in the instruction window has retired.

13. A computer system, comprising:
a memory unit;
a bus coupled to the memory unit for retrieving program instructions therefrom; and
a processor coupled to the bus, wherein the process comprises a register renaming system that includes:
an instruction window comprising a plurality of storage locations each of which stores a single program instruction that may be issued during a single processor cycle, wherein only a subset of the plurality of storage locations may be filled with new program instructions retrieved from the memory unit in a single processor cycle; and
a plurality of register renaming circuits, wherein each of the plurality of register renaming circuits is uniquely associated with a storage location in the subset of the plurality of storage locations and configured to determine if a new program instruction stored in the corresponding storage location is dependent on any older program instructions in the instruction window and to output a renamed source register address for the new program instruction if such a dependency exists.

14. The computer system of claim 13, wherein the register renaming system further comprises:
control logic that assigns one of a plurality of tags to a new program instruction in the instruction window, each of the plurality of tags uniquely identifying a register for storing a result corresponding to a program instruction in the instruction window.

15. The computer system of claim 14, wherein the register renaming system further comprises:
a first-in-first-out (FIFO) buffer that stores the plurality of tags;
wherein the control logic assigns a tag from the head of the FIFO buffer to the new program instruction in the instruction window.

16. The computer system of claim 15, wherein the FIFO buffer includes:
a plurality of slots equal in number to a predetermined size of the instruction window, each of the plurality of slots containing a unique one of the plurality of tags, wherein an order defined by positions of the plurality of tags in the FIFO buffer corresponds to an order of program instructions in the instruction window.

17. The computer system of claim 14, wherein each of the plurality of register renaming circuits includes:
a data dependency checker that determines if the new program instruction in the instruction window is dependent on an older program instruction in the instruction window by comparing a source register address of the new program instruction in the instruction window with a destination register address of the older program instruction in the instruction window.

18. The computer system of claim 17, wherein the data dependency checker comprises:
a compare circuit that compares the source register address of the new program instruction in the instruction window with the destination register address of the older program instruction in the instruction window.

19. The computer system of claim 17, wherein each of the plurality of register renaming circuits further comprises:
tag assignment logic that outputs a renamed source register address for the new instruction in the instruction window, wherein the renamed source register address comprises a tag assigned to the older instruction in the instruction window if the new instruction in the instruction window is dependent on the older instruction in the instruction window.

20. The computer system of claim 19, further comprising:
a register file that stores a source register address and a destination register address for each program instruction in the instruction window, the register file coupled to the data dependency checker for providing the source register address of the new program instruction in the instruction window and the destination register address of the older program instruction in the instruction window to the data dependency checker.

21. The computer system of claim 19, wherein the register renaming system further comprises:
a register file comprising a write data port and a write address port;
wherein the tag assignment logic stores the renamed source register address in the register file by providing the renamed source register address to the write data port and by providing the tag assigned to the older program instruction in the instruction window to the write address port if the new program instruction in the instruction window is dependent on the older instruction in the instruction window.

22. The computer system of claim 21, wherein the register file further comprises:
a read data port and a read address port;
wherein the renamed source register address stored in the register file is accessed on the read data port by providing the tag associated with the new program instruction in the instruction window to the read address port.

23. The computer system of claim 19, wherein the register renaming system further comprises:
a retirement unit that determines whether the new program instruction in the instruction window has retired.

24. The computer system of claim 23, wherein the register renaming system further comprises:
logic that selects one of the register source address of the new program instruction in the instruction window or the renamed register source address based on whether the new program instruction in the instruction window has retired.

\* \* \* \* \*